US012808350B2

(12) United States Patent
Fisher et al.

(10) Patent No.: US 12,808,350 B2
(45) Date of Patent: Nov. 24, 2026

(54) WIND TURBINE BLADE WITH LOW CHORD ROOT

(71) Applicant: Gulf Wind Technology, Avondale, LA (US)

(72) Inventors: Murray Fisher, Morganton, NC (US); David King, Avondale, LA (US)

(73) Assignee: Gulf Wind Technology, Avondale, LA (US)

( * ) Notice: Subject to any disclaimer, the term of this patent is extended or adjusted under 35 U.S.C. 154(b) by 0 days.

(21) Appl. No.: 18/790,164

(22) Filed: Jul. 31, 2024

(65) Prior Publication Data

US 2025/0043766 A1 Feb. 6, 2025

Related U.S. Application Data

(60) Provisional application No. 63/529,816, filed on Jul. 31, 2023.

(51) Int. Cl.
*F03D 1/06* (2006.01)

(52) U.S. Cl.
CPC ...... *F03D 1/06495* (2023.08); *F05B 2230/60* (2013.01); *F05B 2240/301* (2013.01); *F05B 2240/3062* (2020.08)

(58) Field of Classification Search
CPC ..................... F03D 1/06495; F05B 2240/3062
See application file for complete search history.

(56) References Cited

U.S. PATENT DOCUMENTS 7,654,799 B2 * 2/2010 Eyb ........................ F03D 1/0675 416/232
8,777,580 B2 7/2014 Eisenberg
8,834,130 B2 * 9/2014 Fuglsang .............. F03D 1/0675 416/239
9,175,666 B2 * 11/2015 Eisenberg ............. F03D 1/0675
2007/0253824 A1 * 11/2007 Eyb ........................ F03D 1/0675 416/223 R
2010/0209258 A1 * 8/2010 Fuglsang .............. F03D 1/0641 416/223 R (Continued)

FOREIGN PATENT DOCUMENTS

CN 113090442 B 9/2022
DE 102011054711 A1 9/2012

(Continued)

*Primary Examiner* — Eldon T Brockman
(74) *Attorney, Agent, or Firm* — Jones Walker LLP

(57) ABSTRACT

A wind turbine rotor blade that includes a blade body generating a lift when being impacted by an incident airflow. The blade body may include a pressure side and a suction side joining at a leading edge and a trailing edge. The blade body may extend from a root region to a tip region through a transition region. The blade body may have a substantially cylindrical or circular or elliptical or eccentric body of revolution airfoil cross-section beginning from the root region up to a predetermined length, in the direction of the tip region. The blade body may have a substantially linear profile monotonically tapering down from the root region to the tip region. The wind turbine rotor blade may also include a number of flow enhancing components structurally coupled to the blade body and configured to enhance a number of aerodynamic flow characteristics of the blade body.

18 Claims, 7 Drawing Sheets

(56) References Cited

U.S. PATENT DOCUMENTS

| | | | | |
|---|---|---|---|---|
| 2011/0020128 | A1* | 1/2011 | Fuglsang | F03D 1/0675 416/223 A |
| 2011/0142676 | A1 | 6/2011 | Mohammed | |
| 2013/0259689 | A1* | 10/2013 | Eisenberg | F03D 1/0633 416/23 |
| 2016/0252073 | A1* | 9/2016 | Fuglsang | F03D 7/0228 416/23 |

FOREIGN PATENT DOCUMENTS

| | | | |
|---|---|---|---|
| EP | 2917569 | B1 | 10/2016 |
| EP | 3535489 | B1 | 7/2022 |

* cited by examiner

WIND TURBINE BLADE WITH LOW CHORD ROOT

CROSS-REFERENCE TO RELATED APPLICATIONS

This non-provisional patent application claims priority to U.S. provisional patent application No. 63/529,816, filed on Jul. 31, 2023, titled "Low chord wind turbine blade root", the contents of which are incorporated herein by reference in their entirety and should be considered part of this specification.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades (also referred to as "wind turbine blades"). The rotor blades capture kinetic energy of wind using known airfoil principles. The rotor blades transmit the kinetic energy in the form of rotational energy so as to turn a main shaft coupling the rotor blades to a gearbox, or if a gearbox is not used, directly to the generator. More specifically, the rotor blades have a cross-sectional profile of an airfoil such that, during operation, air flows over the blade producing a pressure difference between the sides. Consequently, an aerodynamic lift force (also referred to as "lift force"), which is directed from a pressure side towards a suction side, acts on the rotor blade. The lift force generates torque on the main shaft, which is geared to the generator for producing electricity. The generator then converts the mechanical energy to electrical energy that may be deployed to a utility grid.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
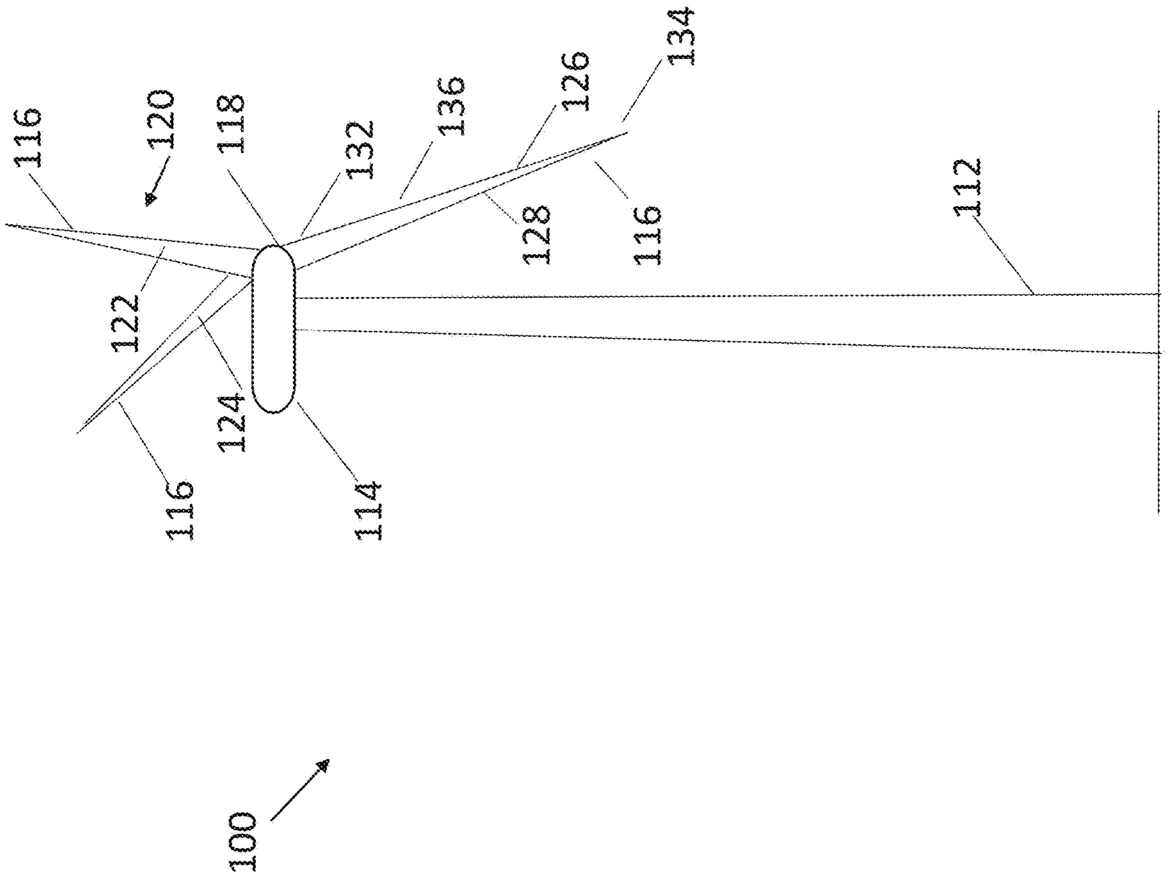
FIG. 1 Related Art
FIG. 1 is an illustrative perspective view of a conventional wind turbine.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Various implementations of the disclosed subject matter relate generally to and may provide improvements to apparatus, systems, and methods to the field of wind turbine rotor blades, and to wind turbine rotor blades having a low chord, multi-element airfoil (also referred to as "MEA") design. More particularly, the disclosed subject matter may relate to operating conditions in the gulf-coastal regions, Atlantic coast, South-East Asia, as examples, that require turbines to produce power with much lower average wind speed than those found in other regions. Additionally, the gulf-coastal regions, for example, may have a high probability of tropical storms (hurricanes) that result in high peak wind events. Such wind events may typically require turbine blades to be constructed with large rotors (swept area) to capture energy with the lower wind speed and make use of excessive structural reinforcements to prevent blade failure in high peak wind events. The added reinforcements are typically used in less than 0.03% of the turbine's life.

Implementations of the present disclosure relate to short section chord and low camber airfoils combined with multi-element airfoils that allow the poor performing airfoils to gain back lift coefficients as in the original high camber foils. This design may reduce the wind turbine blade aspect ratio by reducing the "frontal area" under extreme gust load on the blade. This design may also greatly simplify the wind turbine blade manufacturing process as the blades have far less curvature.

In general, the present disclosure describes a wind turbine rotor blade that includes a blade body generating a lift when being impacted by an incident airflow. The blade body may include a pressure side and a suction side joining at a leading edge and a trailing edge. The blade body may longitudinally extend from a root region to a tip region through a transition region extending between the root region and the tip region. The root region may begin from a proximal end of the blade body and extend up to a predetermined first length of the blade body. The tip region may begin from a distal end of the blade body and extending up to a predetermined second length of the blade body. The transition region may extend between and join the root region and the tip region.

Further, the blade body may have a substantially cylindrical or circular or elliptical or "eccentric body of revolution" airfoil cross-section beginning from the root region up to a predetermined length of the blade body in the direction of the tip region. The blade body may also have a substantially linear profile that monotonically tapers down from the root region to the tip region, through the transition region. The blade body may include a number of modular segments axially joined with each other. Further, the design approach of the current disclosure may essentially amount to decoupling the aerodynamic structure, like an aero-shell, of a wind turbine blade and the structural component, such as a structural spar, of the wind turbine blade.

The wind turbine rotor blade also includes a number of flow enhancing components structurally coupled to the blade body and configured to enhance the aerodynamic flow characteristics of the blade body. The flow enhancing components may include multi-element airfoils, and surface mounted elements. The multi-element airfoils may include slats, flaps, and boundary layer control devices. The boundary layer control components may include ventilation holes, ventilation slots, vortex generators, and Gurney flaps. The surface mounted elements include leading edge elements and surface mounted flaps.

In an aspect of the disclosed subject matter, a method of manufacturing a wind turbine rotor blade is disclosed. The method includes providing a blade body having a shape that generates a lift when impacted by an incident airflow, providing a number of flow enhancing components configured to enhance a number of aerodynamic flow characteristics of the blade body, and physically coupling the flow enhancing components with the blade body. The blade body may include a pressure side and a suction side joining at a leading edge, and a trailing edge. The blade body may also include a cylindrical or circular or elliptical or eccentric body of revolution airfoil cross-section beginning from the root region up to a predetermined length of the blade body in the direction of the tip region. The blade body may also have a substantially linear profile that monotonically tapers down the from the root region to the tip region, through the transition region.

The method may further include longitudinally extending the blade body from a root region to a tip region through a transition region extending between the root region and the tip region. The root region may begin from a proximal end of the blade body and extend up to a predetermined first length of the blade body. The tip region may begin from a distal end of the blade body and extending up to a predetermined second length of the blade body. The transition region may extend between and join the root region and the tip region.

In an aspect of the disclosed subject matter, a wind turbine rotor blade is disclosed. The wind turbine rotor blade includes the blade body and the flow enhancing components disclosed herein.

In an aspect of the disclosed subject matter, a wind turbine is disclosed. The wind turbine includes one or more turbine blades that include the blade body and the flow enhancing components disclosed herein.

FIG. 1 is an illustrative perspective view of a conventional wind turbine 100. As shown, the wind turbine 100 includes a tower 112 with a nacelle 114 mounted thereon. The wind turbine 100 also includes a rotor hub 118 having a rotatable hub 120 with a plurality of rotor blades 116 mounted thereto, which is in turn is connected to a main flange that turns a main rotor shaft (not shown). The wind turbine power generation and control components are typically housed within the nacelle 114. The view of FIG. 1 is provided for illustrative purposes only to place the present disclosure in an exemplary field of use. It should be appreciated that the disclosure is not limited to any particular type of wind turbine configuration.

Figure 2:
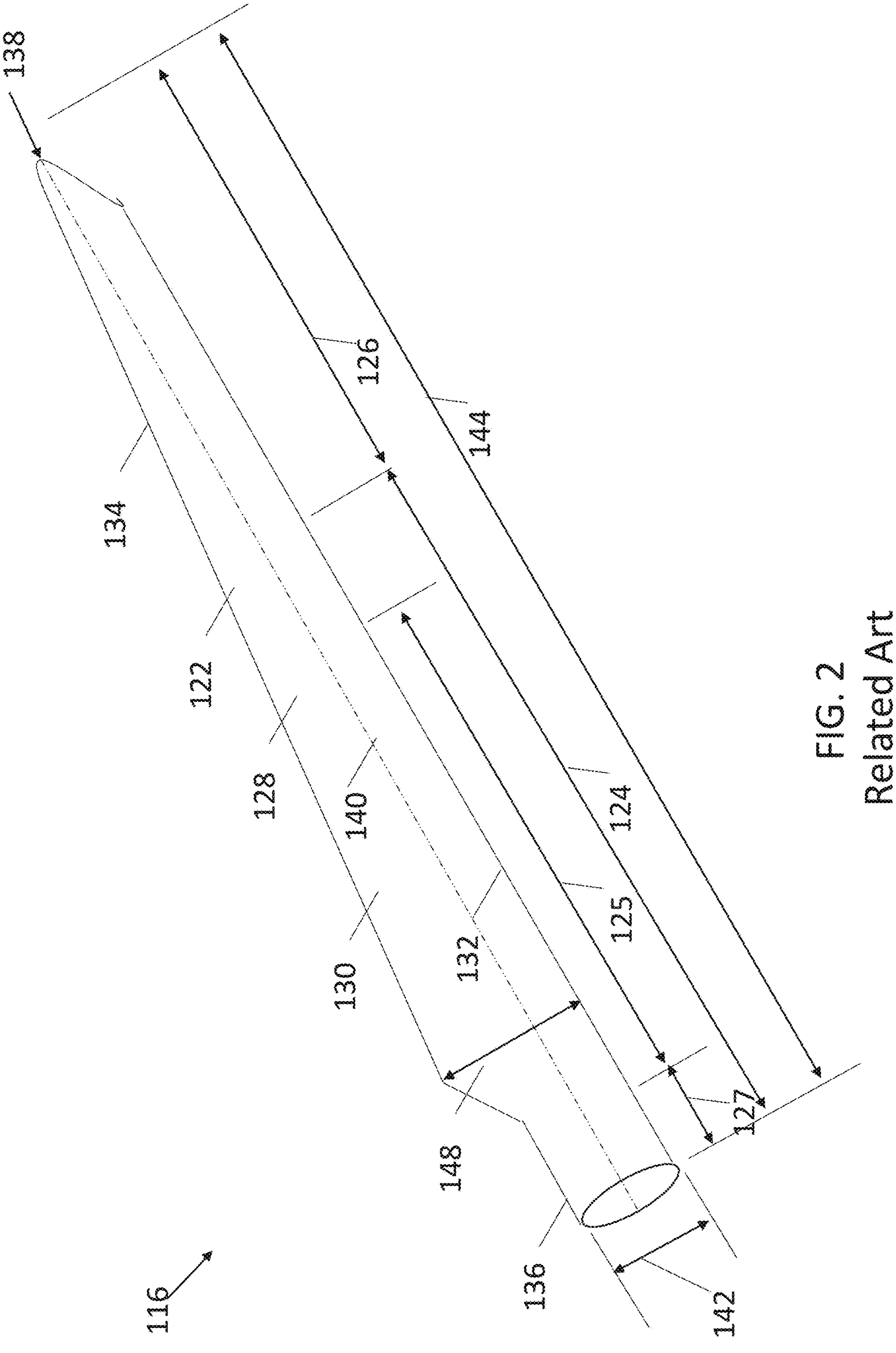
FIG. 2 Related Art
FIG. 2 is an illustrative perspective view of a rotor blade of a wind turbine of FIG. 1.

FIG. 2 is an illustrative perspective view of a rotor blade of a wind turbine, such as may be used with the turbine of FIG. 1 or other similar devices and structures. The rotor blade 116 includes one or more features configured to reduce noise associated with high wind speed conditions. As shown, the rotor blade 116 includes an aerodynamic body 122 having an inboard region 124 and an outboard region 126. The inboard and outboard regions 124, 126 define a pressure side 128 and a suction side 130 extending between a leading edge 132 and a trailing edge 134. The inboard region 124 includes a blade root 136, whereas the outboard region 126 includes a blade tip 138.

The rotor blade 116 defines a pitch axis 140 relative to the rotor hub 118 (FIG. 1) that typically extends perpendicularly to the rotor hub 118 and the blade root 136 through the center of the blade root 136. A pitch angle or blade pitch of the rotor blade 116, i.e., an angle that determines a perspective of the rotor blade 116 with respect to the air flow past the wind turbine 100, may be defined by rotation of the rotor blade 116 about the pitch axis 140. In addition, the rotor blade 116 further defines a chord 142 and a span 144. More specifically, as shown in FIG. 2, the chord 142 may vary throughout the span 144 of the rotor blade 116. Thus, a local chord may be defined for the rotor blade 116 at any point on the blade 116 along the span 144.

In certain embodiments, the inboard region 124 may include from about 0% to about 50% of the span 144 of the rotor blade 116 from the blade root 136 in the span-wise direction, whereas the outboard region 126 may include from about 50% to about 100% of the span 144 of the rotor blade 116 from the blade root 136. More specifically, in particular embodiments, the inboard region 124 may range from about 0% span to about 40% of the span 144 of the rotor blade 116 from the blade root 136 in the span-wise direction and the outboard region 126 may range from about 40% span to about 100% span 144 from the blade root 136 of the rotor blade 116. As used herein, terms of degree (such as "about," "substantially," etc.) are understood to include a +/−10% variation.

Referring further to FIG. 2, the inboard region 124 may include a transitional region 125 of the rotor blade 116 that includes a maximum chord 148. More specifically, in one embodiment, the transition region 125 may range from about 15% span to about 30% span of the rotor blade 16. In addition, as shown, the rotor blade 116 may also include a blade root region 127 inboard of the maximum chord 148 and within the inboard region 124.

Figure 3:
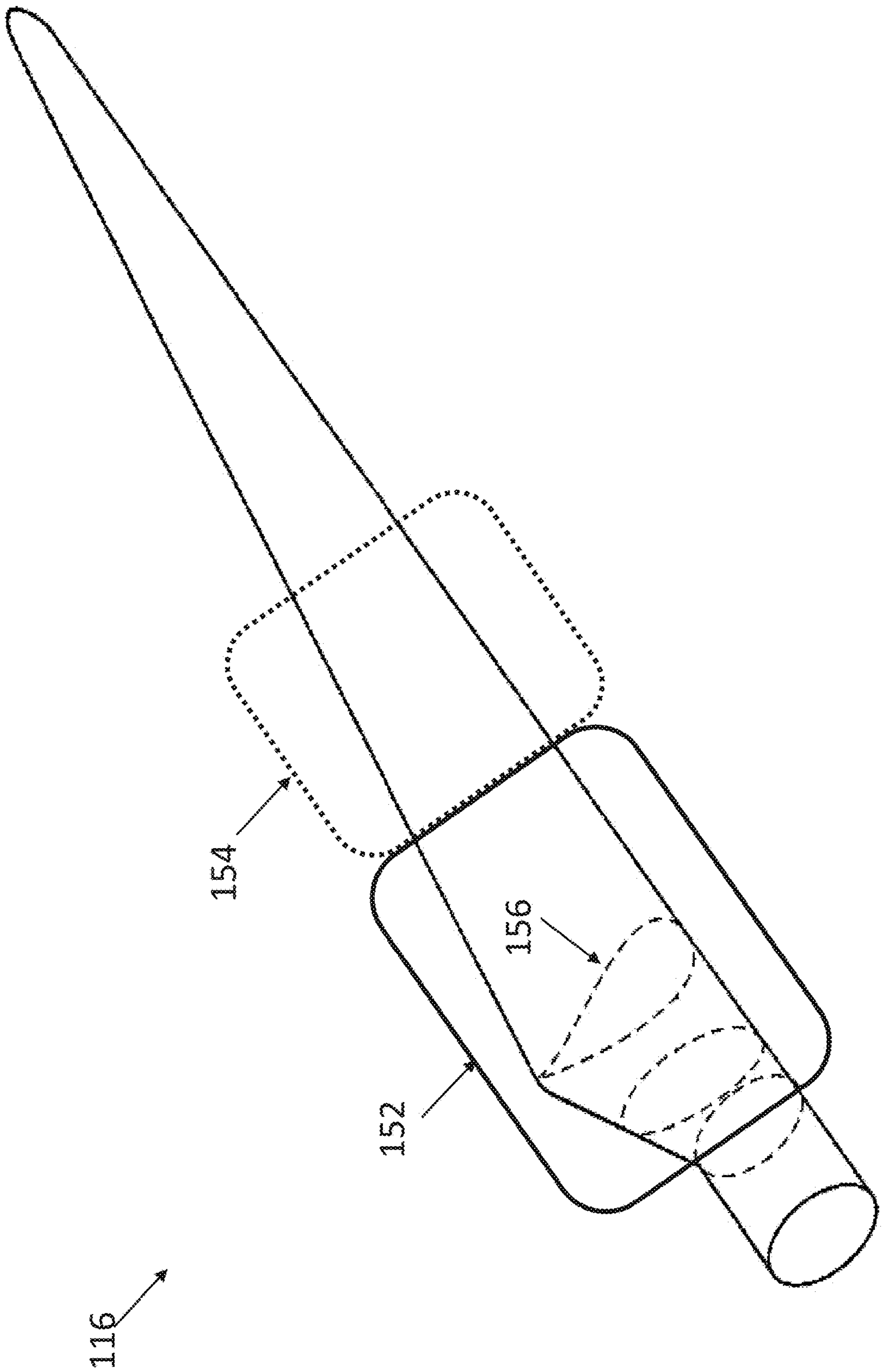
FIG. 3 is an illustrative perspective view of a rotor blade of a wind turbine of FIG. 1.

FIG. 3 is an illustrative perspective view of example planforms 152 and 154, and example cross sections 156 of a rotor blade, such as for use with a wind turbine of FIG. 1 or similar devices and structures. Wind turbine blades convert the energy of the wind into usable shaft power, known as torque. As is known in wind turbine art, the blade planform 152, 154 are the shapes of the blade, and these may determine the performance of the wind turbine blades. The ideal planform for a wind turbine blade is a complex three-dimensional shape that varies depending on the size and type of turbine.

Referring to FIG. 3, for regular (not stalled) flow conditions, the lift and drag forces are $$L = \frac{1}{2}\rho V_{rel}^2 c C_L$$

functions of the angle of attack of the air relative to the airfoil. The exact dependency of lift and drag forces on angle of attack has to be determined experimentally or by numerical simulation and depends both on the airfoil shape and on the Reynolds number, amongst other parameters such as surface roughness, blade surface condition and the like.

These relationships are conventionally expressed in terms of the lift and drag coefficients, CL and CD, respectively, defined via with L and D the lift and drag forces, respectively, p the density of the air, S the planform area of the blades, and V the velocity of the air relative to the moving blades.

$$C_L = \frac{L}{\frac{\rho}{2}SV^2}, C_D\frac{D}{\frac{\rho}{2}SV^2}.$$

Taking the vector product of the force vector F with the radius vector of the turbine arm, one can calculate the torque T that each turbine blade generates. This torque will thus be a function of the wind speed U∞, local tip-speed ratio TSR*, angle of attack of the blade a and of the rotational angle θ, so we have T=T (U∞, TSR*, α, θ). It is important to note that, unless the angle of attack a is chosen judiciously, this torque will be negative (against the direction of rotation of the turbine), and that, for each set of the parameters given above, there is an optimal angle of attack at each position of the blade during its rotation such that the positive (driving) torque is maximized.

For wind turbines and wind turbine blades, the pressure side of the blade is also defined and known as the windward side or the upwind side, whereas the suction side is also defined and known as the leeward side or the downwind side. Typically, the length of the wind turbine blade may be 10 meters, or 40 meters, or 50 meters, or 60 meters, or more. For example, the blades may be 70 meters, or 80 meters. Further, example blades may have a length of 90 meters or 100 meters or 115 meters.

The blade and in particular, the blade body includes a shell structure made of a composite material. The composite material may be a resin matrix reinforced with fibers. In most cases the polymer applied is thermosetting resin, such as polyester, vinylester or epoxy. The resin may also be a thermoplastic, such as nylon, polyvinyl chloride (PVC), Acrylonitrile butadiene styrene (ABS), polypropylene or polyethylene, or another thermosetting thermoplastic, such as cyclic polybutylene terephthalate (PBT) or polyethylene terephthalate (PET). The fiber reinforcement is most often based on glass fibers or carbon fibers, but may also be plastic fibers, plant fibers or metal fibers. The composite material often includes a sandwich structure including a core material, such as foamed polymer or balsawood.

The blade typically includes a longitudinally extending reinforcement section made of reinforcement layers made of fibers, pre-infused parts, pultrusions and the like. The reinforcement section, also known as "main laminate" or "spar cap", may typically extend from a root region proximate to a rotor hub to a tip region distant from the rotor hub, through a transition region extending between the root region and the tip region.

The root region may typically extend along at least 25%, or 30%, or 40%, or 50%, of the airfoil region. The root region may even extend along at least 60%, 70% or 75% of the airfoil region. The extent of the root region may even be up to 100%, when the tip region is considered not being part of the airfoil region.

For a standard blade, as in FIG. 2, the root region 127 is often considered the cylindrical portion of the blade. Often this region may extend for 3-5 meters from the root face of the blade. In this region, the chord length may remain constant, and the airfoil shape may not vary. After this cylindrical portion, the blade may begin to transition into a region of increasing chord length (up to a maximum chord length 148). In this region, the airfoil shape may be a blend between the circular cross section and the first airfoil used at the region of maximum chord. This root to maximum chord region is governed by the maximum chord length that can be manufactured or transported, and represents an aerodynamic compromise accepted in order to accommodate these outside constraints on the design.

The tip section is defined as the region of the blade responsible for generating the majority of the total blade power, and often falls within the outer $\frac{1}{3}^{rd}$ to ½ of the blade span. In the tip region the airfoils may be predominantly defined as those having cambered surfaces, with defined trailing edges, and is generally consistent with the choice of airfoils used in the standard blade designs. For the low chord root concept of the current disclosure, the root region may be defined as a region wherein the cross sections may have a shape that is circular, elliptical, or an "eccentric body of revolution" and may be marked by a constant or monotonically decreasing chord length. In another embodiment, the chord length may initially increase, and then decrease again.

Figure 4:
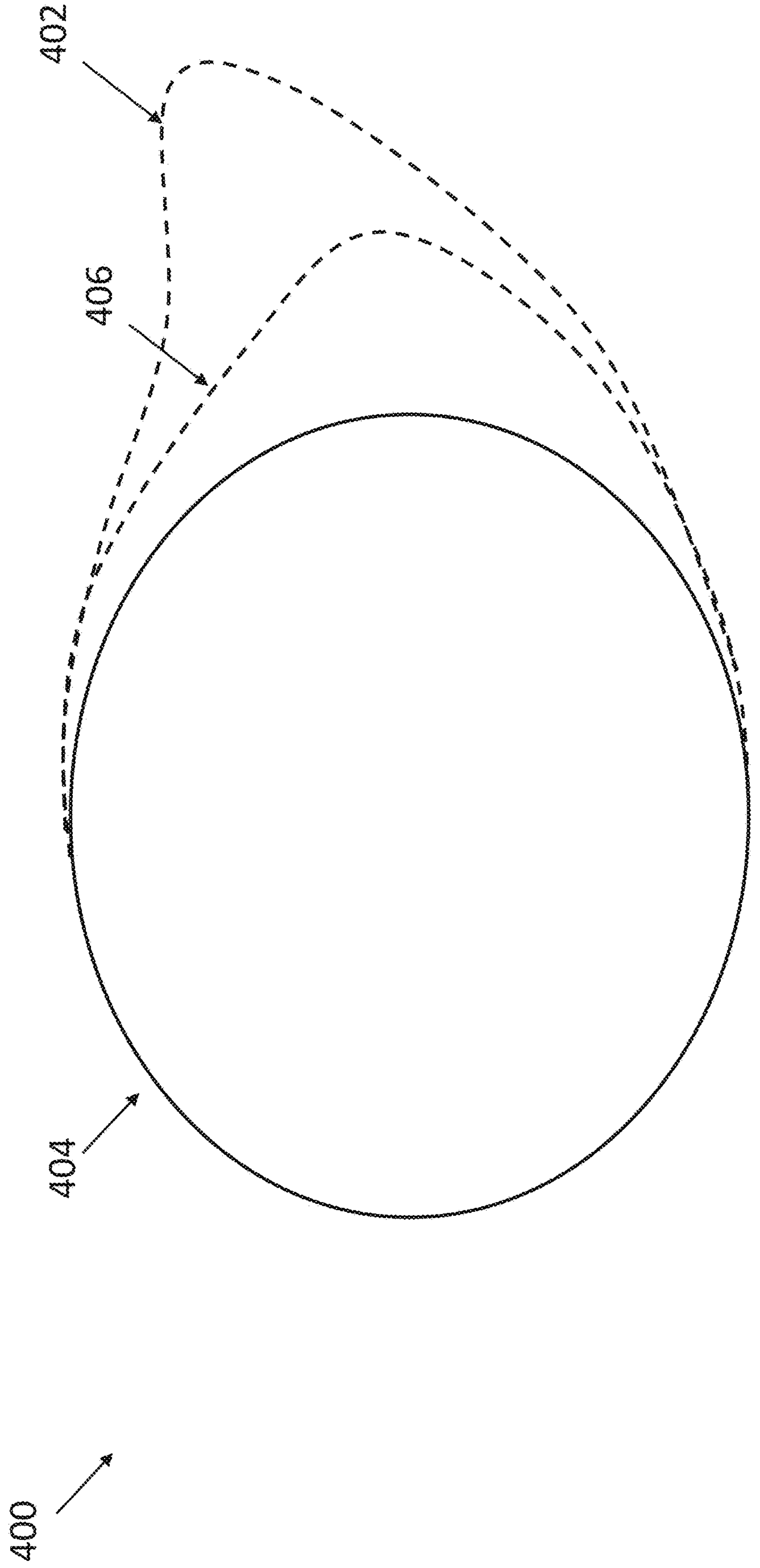
FIG. 4 is an illustrative front cross-sectional view of the root region of a rotor blade of a wind turbine, in accordance with an embodiment of this disclosure.

FIG. 4 is an illustrative front cross-sectional view 400 of the root region of a rotor blade of a wind turbine, in accordance with an embodiment of this disclosure. A conventional oblong-shaped profile 402 may redesigned by the method and system of this disclosure to a cylindrical or circular low chord root profile 404 or eccentric body of revolution low chord root profile 406.

Conventionally, wind turbine blades are designed by initially designing the outer shape and the aerodynamic performance of the blade itself in order to obtain an ideal loading and ideal axial induction for the blade. Subsequently, it is determined how to manufacture the blade in accordance with the aerodynamic design specifications for the blade. The aerodynamic shapes of such blades are typically complex with segments having double-curvature contours and several different airfoil shapes along the radial extent of the wind turbine blade. Conventional blade airfoils begin with the cylindrical root region that expands out to a maximum chord (also referred to as "max chord") and then it begins to taper along the length of the blade.

Conventional wind turbines blades, being designed for ideal operating conditions, encounter performance and structural challenges under non-ideal weather conditions and/or at non-ideal spatial or geographical regions (also referred to as "spatio-temporal operating conditions"). For example, offshore wind turbines in regions around the globe, including the Gulf of Mexico, Southeastern Atlantic, Caribbean Ocean, Southeast Asia, Northwestern Australia, and potentially other such areas may be subject to a combination of low average annual wind speeds and extreme wind events such as typhoons/hurricanes. The conventional approach for these conditions is to either design the rotor large to capture more energy from a low wind speed environment or to use large turbine nacelles (for example, 4 MW nacelles and tower) and smaller rotor diameter (for example, 115 m instead of 140 m) to prevent damage from extreme winds. These approaches, however, are contradictory and therefore not viable in a combined environment of low average annual wind speeds and typhoon conditions.

Another conventional approach is to harden the blade structure so that the blade can survive extreme events. This approach requires a significant increase in the mass of blade for an event that may occur during only about 0.3% of the lifetime of the product. In another conventional approach, inexpensive blades may be used that are easily replaceable at low cost after a damage occurs. This approach, however, presents a safety risk. Conventional blade manufacturers have also explored "teetering rotors", which allow the blades to bend downwind during an extreme event. This concept intends to mimic a palm tree, which allows its fronds to fold in on themselves during a typhoon or hurricane. This option requires large and expensive teetering hub connections that may not always be feasible.

Further, during extreme wind events, the wind flow may not cross the airfoil of a wind turbine blade from the leading edge to the trailing edge but may instead impinge on the blade at high inflow angles to the chord. In this scenario, conventional blades may act like a flat plate or bluff body (like a ship sailing into a hurricane with the sails fully deployed) and the extreme operating conditions may lead to high structural loads and catastrophic failure of the blade.

In various implementations of the present disclosure, the blade is first designed to be "failsafe" (also referred to as "always safe"), meaning the base blade airfoils (also referred to as "blade body airfoil" or "blade body") are optimized for structure, manufacturing, and extreme loads so that during peak load events (also referred to as "design load cases") the load on the blade is minimized. The appearance of the blade body may approach a cylindrical or circular elliptical or eccentric body of revolution shaped profile. The blade body may also have a symmetric airfoil, conventionally not used in modern wind turbine blades.

The present disclosure provides a useful alternative to conventional designs in which it is possible to increase the ideal nominal performance of the blades from a nominally "always safe" design state. This is accomplished by reducing the blade chord length by shaving off the maximum chord region of a conventional oblong-shaped profile 402 to a cylindrical or circular elliptical shaped profile, as represented by the low chord root profile 404 or an eccentric body of revolution profile 406 and adopting a multi-element airfoil configuration (explained in more detail in relation to FIG. 5 below). Several airfoil elements, such as leading edge slats, trailing edge flaps, and potentially a full cascade of multiple elements enable the combined airfoil elements to generate additional down force, lift, drag or other design objectives. The additional lift and other forces, then translate into an improved blade performance, without sacrificing the offline/extreme load case of "always safe" design. The combination of the blade body airfoil and the multi-element airfoil configuration makes it possible to achieve a combination of chord and airfoil lift coefficient that is likely to perform satisfactorily under target loads (i.e., moments and torque) distribution along the blade span during both normal power production mode and extreme load conditions.

During extreme wind events, the wind flow may not cross the airfoil from leading edge to trailing edge, but instead may impinge on an idling rotor at very high (non-operational) angles of attack to the local airfoil cross-section. In this scenario conventional blades may act like a flat plate or bluff body. In contrast, embodiments disclosed herein may include a much lower chord length and impingement area that experience a much lower extreme load (like a ship sailing into a hurricane with the sails fully "trimmed").

In order to arrive at an optimal structural design of a turbine blade, a 10% or a 15% design reduction from the extreme environment and extreme loads may be calculated and the structural parameters and the aerodynamics parameters of the blade may be computed backwards (in comparison to conventional approaches), so that they match the limiting operating condition loads cases with the turbine in an offline state. Non-limiting example design limiting load cases may include extreme gust or extreme loads from a hurricane or a typhoon when a turbine may fail to function. In a typical hurricane or typhoon situation, the turbine control systems may attempt to adjust and orient the turbine to follow the wind and turbine may have a yaw system that may remain active to minimize any misalignment between the wind direction and the yaw position of the rotor so that the rotor faces the wind. However, there may be moment to moment variation in the mean windspeed and the direction of the wind. For example, the wind direction may change across from one side of the rotor to the other, the extent of change commonly known as "veer". Additionally, there may be a change in wind speed from the top of the rotor to the bottom of the rotor. As a result, even if the turbine faces are perfectly pointed into the wind, the flow may misalign the blade and prevent it from functioning.

In various implementations of the present disclosure, the chord length of the blade is reduced so that instead of having a max chord design, a substantially circular airfoil cross-section (designed based on the diameter of the blade root/hub connection) is implemented. Further, the substantially circular airfoil cross-section may taper in thickness and chord from the root region to the tip region to approach a first mating outboard airfoil. The mating with the outboard airfoil may occur in an inner section of the blade (for example, at ¼ to ⅓ length of the blade span) or may extend out to occur at 50% of the blade span. Unlike in a conventional blade, which has a maximum chord length at approximately ⅓ of the blade span, in implementations of the present disclosure the limiting chord length may be defined by the blade root diameter and the diameter of the first mating outboard airfoil section.

The blade body may be configured to satisfy a number of structural load constraints related to a spatio-temporal operating condition. The blade body may be configured to satisfy a number of structural load constraints related to a spatio-temporal operating condition. A non-limiting example of a structural load constraint may be stall-induced vibration. "Stall" is a condition wherein the angle of attack of the incident wind relative to the turbine blade profile increases with increased wind speed to the point wherein laminar flow over the low-pressure (back) side of the blade is disrupted and backflow is induced. Although more common at the low pressure side of the blade, stall may also occur at the high pressure (front) side of the blade. In a stall condition, the motive force on the blade is significantly reduced. Other factors can also contribute to stall, such as blade pitch, blade fouling, and so forth. Stall is a design consideration and stall regulation is an effective design feature to protect wind turbines in high wind conditions, particularly turbines with fixed-pitch blades. On stall-regulated turbines, the blades are locked in place and cannot change pitch with changing wind speeds. Instead, the blades are designed to gradually stall as the angle of attack along the length of the blade increases with increasing wind. Accordingly, it is important to know the flow characteristics of a turbine blade profile, particularly with respect to the stall induced vibration conditions at the onset of stall.

Further, a non-limiting example of a structural load constraint may be structural damping. As is commonly known in structural dynamics, structural damping is the process of reducing the vibrations and oscillations of a structure by dissipating its energy. It is an essential aspect of structural dynamics, the study of how structures respond to various loads and forces. These forces can induce oscillations and fatigue, which may affect the power generation, efficiency, and lifespan of the wind turbine blades. Therefore, structural damping is vital for the wind industry, as it may optimize the energy harvesting, reduce the maintenance costs, and increase the sustainability of the structures. Some of the best practices and standards for structural damping in the wind industry include using aerodynamic damping, magnetic damping, hydraulic damping, and piezoelectric damping. Further, different resonance systems and fibers such as natural fibers, may have higher damping properties and may be used to increase structural damping in the coupled system of the blade body and the flow enhancing components. Increased structural damping in this coordinated system may help prevent occurrence of damaging events such as vortex shedding at a set frequency (commonly known as "screw hole frequency") that resonates with the blade frequency and damages the blade.

Blade chord length for conventional large offshore blades may typically be more than 5 m in the root to max chord region. The short section chord length of the present disclosure may be below 3 m. Further, the airfoils for conventional large offshore blades are about 40% thick (denoting the ratio of the maximum physical thickness to the maximum chord length). For the short section chord length of the present disclosure, the airfoils may be 40% to 80% thick. In other words, the airfoil cross-section may be substantially circular.

Including such structural constraints on the design parameters of the blade segment means that the blade segment deviates from the ideal design with respect to aerodynamics, in which the chord length is equal in all radial directions. Thus, such a blade segment may inherently be non-ideal with respect to aerodynamics. The substantially circular airfoil cross-section, acting as a bluff body may be less aerodynamic and may not provide the desired aerodynamic performance. Nominally, 40+% thick airfoils do not have high lift coefficients (CL>1.5). This deviation is compensated for by using flow enhancing components (also referred to as "multi-element airfoil" elements or "add-ons") to the blade in order to adjust the design lift and inflow properties to near-optimum conditions. Specifically, the lift coefficient may increase from 1.5 to 4-5 at a much smaller chord length.

Figure 5:
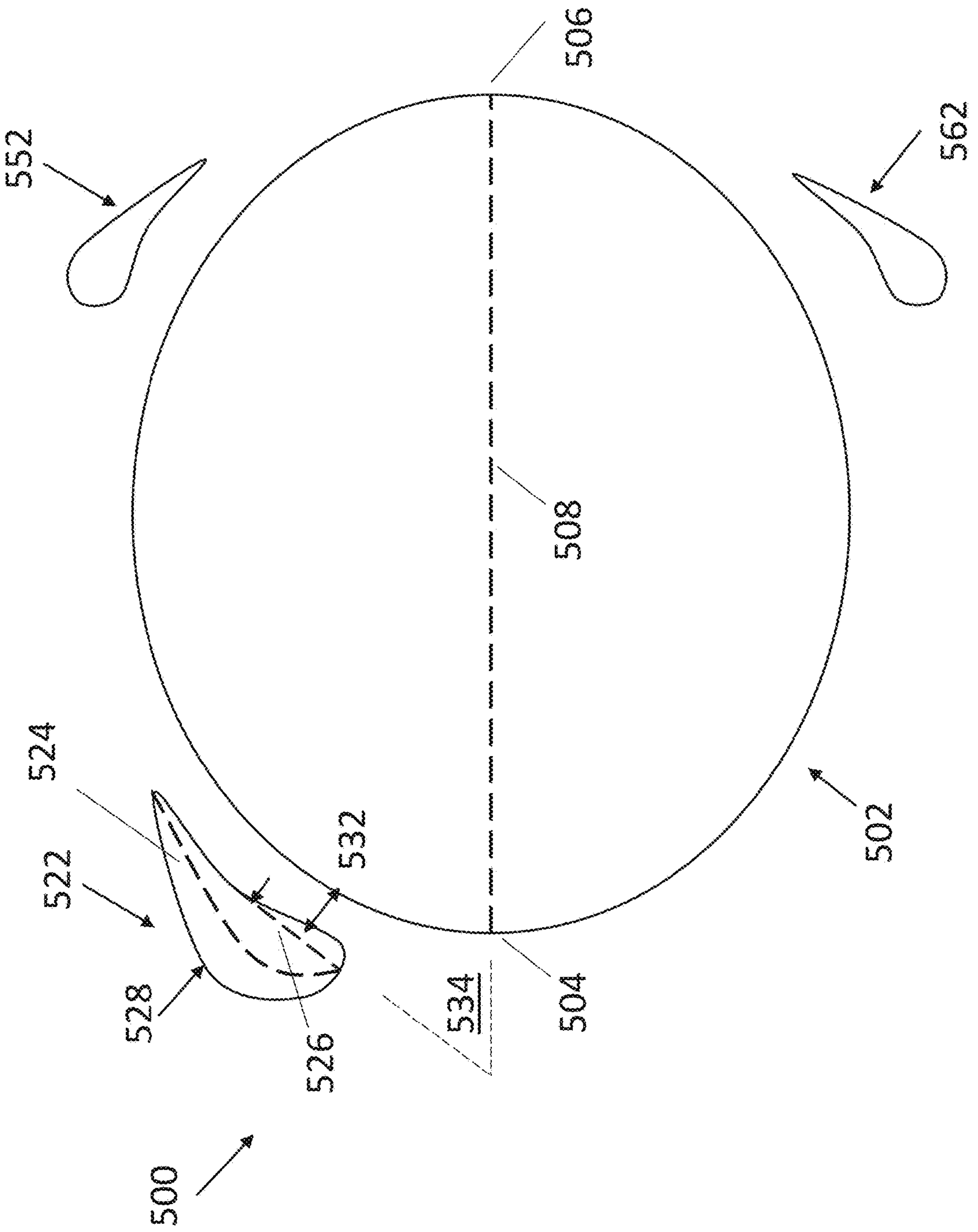
FIG. 5 is an illustrative front cross-sectional view of the root region of a rotor blade and flow enhancing components of a wind turbine, in accordance with an embodiment of this disclosure.

FIG. 5 is an illustrative front cross-sectional view 500 of the root region of a rotor blade and flow enhancing components of a wind turbine, in accordance with an embodiment of this disclosure. Referring to FIG. 5, the low chord root may have a circular profile 502 with a leading edge 504 and a trailing edge 506. An example chord 508 may extend from the leading edge 504 to the trailing edge 506. There may be a number of multi-element airfoils such as leading edge multi-element airfoil 522 and trailing edge multi-element airfoils 552 and 562 that are physically coupled with the main blade body represented by the low chord root profile 502.

Referring to the example leading edge multi-element airfoil 522 (also known as a "slat"), it may have a curved camber 524 and a chord 526 such that there may be a designed thickness distribution 528 across the cross-section of the slat. The slat 522 may be positioned at a gap 532 from the surface of the main blade body 502 and at an angle 534 with the chord 508 of the main blade body 502. In a similar manner, the trailing edge multi-element airfoils 552 and 562 (also known as a "flap") may have corresponding design parameters that typically characterize the aerodynamic performance of the flaps 552 and 562. The airfoil array, or multi-element airfoil configuration, consisting of 522, 552, 562 and 502 may each have shapes with defined cambers, and thickness distributions. Referring to FIG. 5, the generalized airfoil shapes with chord, thickness and camber, are completely open and the MEA elements may not be restrictive. In an embodiment, a "flap" or "slat" may be restrictive.

Figure 6:
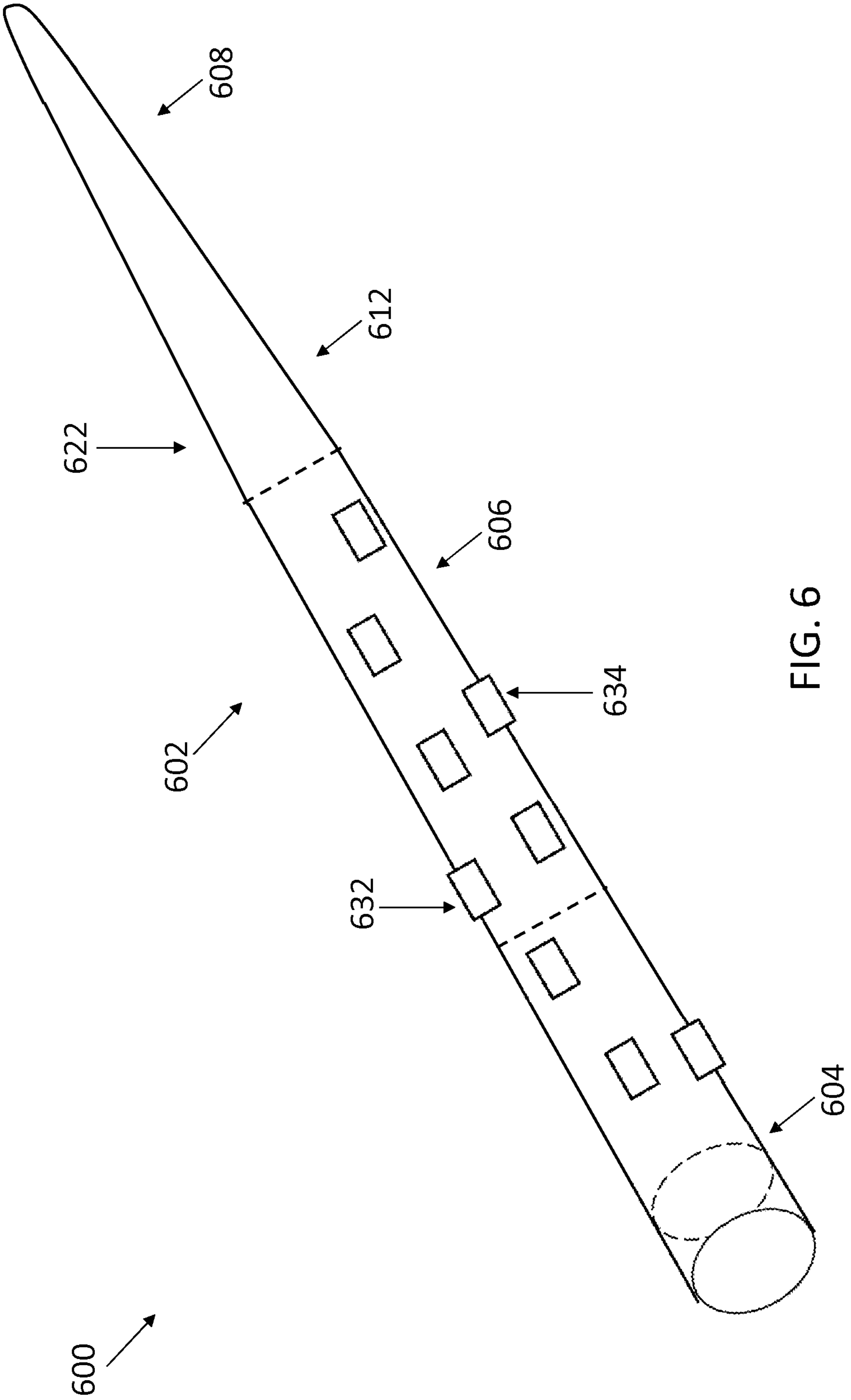
FIG. 6 is an illustrative top cross-sectional view of the root region of a rotor blade and flow enhancing components of a wind turbine, in accordance with an embodiment of this disclosure.

FIG. 6 is an illustrative top cross-sectional view 600 of a rotor blade 602. The rotor blade 602 may include a root region 604, a transition region 606 and a tip region 608. The tip region, in an instance, may be part of a modular segment 612 of the rotor blade 602. The rotor blade 602 may also include a number of example flow enhancing components 632, 634, and so on, in accordance with an embodiment of this disclosure. There may be a number of ways that the flow enhancing components 632, 634 may be configured and coupled with the blade body. There may be several different variations in the positions, placements and connections of the flow enhancing components 632, 634 relative to the blade body 602 so that the aerodynamics the blade body 602 and the flow enhancing components 632, 634 may be designed as an integrated and coordinated system. The flow enhancing components 632, 634 may be arranged with a distance to the blade body 602. Alternatively, the flow enhancing components 632, 634 may be connected to the surface of the blade body 602, thus as such altering the surface envelope of the blade body 602 itself.

The dimensions of the flow enhancing components 632, 634 may typically be defined in terms of relative chord length. For example, the chord length of the flow enhancing components 632, 634 may be between 5% and 35% of the chord length of the blade body 602.

The flow enhancing components 632, 634 may include a multi-element airfoil, such as a slat, or a flap, i.e., the flow enhancing components 632, 634 preferably includes multi-element parts for changing the profile characteristics of different blade segments. The multi-element airfoil is adapted to alter the inflow properties and the loading of the root region of the blade. Preferably, the multi-element airfoil alters at least a substantial part of the root region, for example, along at least 50% of the root region. Thereby, it is possible to change a number of design parameters, such as the design lift, the camber and the angle of attack for the segment, from a base design (of the blade body), which has an inherently non-optimum design from an aerodynamic point of view with respect to such parameters, but which is optimized from a manufacturing point of view.

Thus, it is possible to retrofit the multi-element parts to the blade body in order to improve or optimize the aerodynamics of the blade and/or the turbine as a whole. Accordingly, one or more multi-element airfoils may be arranged in the proximity of and/or along the leading edge of the blade body. Further, one or more multi-element airfoils may be arranged in the proximity of and/or along the trailing edge of the blade body. Accordingly, the blade body may be constructed as a load carrying part of the blade, whereas the flow enhancing components are used to optimize the aerodynamics with respect to matching the local section aerodynamic characteristics to the rotor design point. Yet again, the flow guiding device may be adjustable in order to passively eliminate variations from inflow variations.

The multi-element airfoil may be arranged in a fixed position in relation to the blade body. Thereby, the blade may be permanently or semi-permanently adjusted in order to compensate for the non-ideal profile of the blade body. Alternatively, the multi-element airfoil may be actively adjusted in relation to the blade body. Thus, the design parameters may be adjusted actively, for example, according to the operational conditions for the wind turbine. The flow enhancing components or the multi-element airfoil may be translational and/or rotational operational or adjustable in relation to the blade body. In an embodiment, the multi-element airfoils may be installed on top of standard airfoils. The multi-element airfoils may also include a surface mounted element, which alters an overall envelope of the root region of the blade. Advantageously, the surface mounted element is arranged in proximity of the leading edge and/or the trailing edge of the blade body.

The multi-element airfoils may also include boundary layer control components, such as holes or a slot for ventilation, vortex generators and a Gurney flap. Preferably, the boundary layer control components are used in combination with the multi-element airfoils or the surface mounted elements. Multi-element airfoils or surface mounted elements are typically necessary for achieving the large shift in the axial induction factor, i.e., for rough adjustment to the target. However, the boundary layer control components may be utilized in order to fine adjust the axial induction factor to the target.

In an embodiment, the flow enhancing component may include a number of ventilation holes for blowing or suction between an interior of the blade and an exterior of the blade. The ventilation holes are advantageously applied to the suction side of the blade. The ventilation holes may be utilized to create a belt of attached flow. Air vented from the ventilation holes may be used to energize and reenergize the boundary layer in order to maintain the flow attached to the exterior surface of the blade. Alternatively, the ventilation holes may be used for suction, whereby the low momentum flow in the boundary layer is removed and the remaining flow thereby reenergized and drawn towards the surface of the blade. Alternatively, the ventilation holes may be used to generate a pulsating flow, for example, as a synthetic jet. Despite not generating a flow, this transfers momentum to the flow and thereby reenergizes the boundary layer and alters flow separation. The ventilation holes may be provided with membranes positioned near the exterior surface of the blade or near the interior surface of the blade.

In an embodiment, the multi-element airfoils may include a number of surface mounted elements. A first trailing edge element may be mounted near the trailing edge of the blade on the suction side of the blade, a second trailing edge element may be mounted near the trailing edge of the blade on the pressure side of the blade, and a leading edge element may be mounted near the leading edge of the blade on the pressure side of the blade.

By utilizing the leading edge element and the second trailing edge element on the pressure side of the blade, the effective camber of the airfoil may be increased and the operating lift coefficient at the rotor design point may be increased. The maximum lift coefficient may also be increased. By utilizing the first trailing edge element on the suction side of the blade, the camber of the airfoil may be reduced and the operating lift coefficient at the rotor design point as well as the maximum lift coefficient may be decreased.

Slats and flaps may be implemented in various ways. A slat may for instance be connected to the blade body via a connection element. The slat may be connected to the blade body in such a way that it is rotational and/or translational movable in relation to the blade body. Likewise, a flap may be provided as a separate element which may be moved rotational and/or translational in relation to the blade body. Alternatively, the flap may be implemented as a camber flap that can be used to change the camber line of the blade profile.

Physically, the multi-element airfoils may be designed to modify the nature of the flow around the blade body airfoil. A leading edge slat (or flap) airfoil may reduce the magnitude of the suction peak on the blade body airfoil and enable the flow over the main airfoil to be less susceptible to flow separation. Similarly, a trailing edge slat (or flap) airfoil may increase the overall circulation generated and enhances the lift over the system.

The design variables for the leading edge or the trailing edge multi-element airfoils may include several geometrical parameters, such as chord length expressed as percentage of the blade body airfoil chord length, thickness distribution, camber, angle between the chord line of the blade body airfoil and the leading edge (or trailing edge) airfoil element, the gap or spacing between the two airfoils, and the surface distance from the leading edge (or trailing edge) to the ¼ chord point of the airfoil element.

The multi-element airfoils may include a Gurney flap attached to the pressure side at the trailing edge. By utilizing a Gurney flap, the operating lift coefficient at the rotor design point may be increased as well as the maximum lift coefficient. Other attachments with similar airfoils may be a triangular wedge or a rip forming an angle of more than 90 degrees with the surface of the profile.

In an embodiment, the multi-element airfoils may include a number of vortex generators. The vortex generators generate coherent turbulent structures, i.e., vortices propagating at the surface of the blade towards the trailing edge of the blade. The vortex generators may efficiently change the optimum angle of attack for the radial section and may alter the lift of the blade section by reenergizing the boundary layer and delaying separation.

In an embodiment, a spoiler element may be used for compensating for off-target design parameters of the blade body of the blade, which protrudes from the pressure side of the blade. The spoiler element is usually used at the transition region of the blade and possibly at an inboard part of the airfoil region of the blade. By utilizing a spoiler element, the maximum lift coefficient may be increased. By utilizing a spoiler element positioned at a forward position of the blade, i.e., towards the leading edge of the blade or towards the position of maximum thickness, the operating lift coefficient at the rotor design point may be increased as well as the maximum lift coefficient. By utilizing a spoiler element positioned at a backward position of the blade, i.e., towards the trailing edge of the blade or towards the position of maximum thickness, the operating lift coefficient at the rotor design point as well as the maximum lift coefficient may be shifted towards a higher value as well as towards a higher angle of attack.

In an embodiment, active flow control may be used in variable and extremely disruptive wind load environments. Active flow control is defined as control and modification of the aerodynamic behavior of the blade achieved by using lift enhancement created by a combination of unsteady momentum addition (and consequent vorticity production) and the Coanda effect as the fluid flow, energized by introducing jets of higher velocity fluid into the aft portions of the curved blade surface that are at risk of loss of energy caused by boundary layer separation. Active flow control may be achieved in an aerodynamic structure, such as a blade, by the addition of momentum at a position that is proximate to the trailing edge and/or the leading edge of the blade.

The unsteady momentum addition is created by the unsteady injection of fluid either from active flow control devices or from pressurized fluid sources that provide pulsed or intermittent injection. These active flow control devices and other sources of pulsed fluid are also termed unsteady sources because the fluid is transmitted over a curved surface of the blade in a time-varying fashion at a selected frequency.

The Coanda effect modifies the aerodynamic forces and moments when a wall-jet produced by the active flow control devices or other pressurized fluid sources is blown over a curved wall of the blade. The wall-jets are used to manipulate the location of the leading edge and/or trailing edge stagnation points, changing the bound circulation around the blade and hence controlling the lift and the flow-turning capability of the blade. In an embodiment, the unsteady wall-jets of fluid may follow the entire curvature of the trailing edge and/or the leading edge to facilitate active flow control. In another embodiment, the unsteady wall-jets of fluid may follow over only a portion of the curvature of the trailing edge and/or the leading edge to facilitate active flow control.

The sources of the added momentum or pulsed fluid may be localized zero mass flow actuators (e.g., synthetic jets) or other active flow control actuators that do not require piping, ductwork and sources of pressurized fluid such as pumps, or the like. These active flow control devices are light-weight, are generally located in the blade, and are integrated into the blade structure. They are designed to add momentum and emit a pulsed fluid at a controlled velocity (or momentum) and frequencies to add unsteady lift and produce the wall-jets. Examples of such devices include piezoelectric synthetic jets (such as dual bimorph synthetic jet (DBSJ) devices), plasma-driven actuators, electromechanically driven actuators, or the like.

The pulsed fluid of a selected strength may be ejected over the curved surface of the trailing edge and/or the leading edge at a selected frequency to produce active flow control.

In an embodiment, the use of active flow control permits controlling the amount of lift generated by the blade. When the blade is subjected to operating conditions for it was not hitherto designed and generates higher than expected loads, the generated lift can be varied by activating the active flow control devices or other pressurized fluid sources and by varying the intensity of the pulsed fluid from these sources. For example, under varying and unpredictable loads, the source of pulsed fluid can be activated to different levels thereby producing pulsed fluids of varying intensity (depending upon the level of actuation) to compensate for the unpredictability in load levels thereby providing for a smooth output from the wind turbine despite variations in prevailing wind conditions.

The ability to mitigate system loads effectively by using active flow control to provide reduced aerodynamic loading when needed permits use of large rotor diameters, while the ability to extract more power from blades additionally justifies use of such large rotor diameters. These techniques increase the available blade size and the power that can be extracted, thereby resulting in an improved rotor blade.

The fluid used to obtain active flow control may be air, water, steam, or any other fluid that can be used for providing blades with lift, depending on the fluid medium in which the blade operates.

Figure 7:
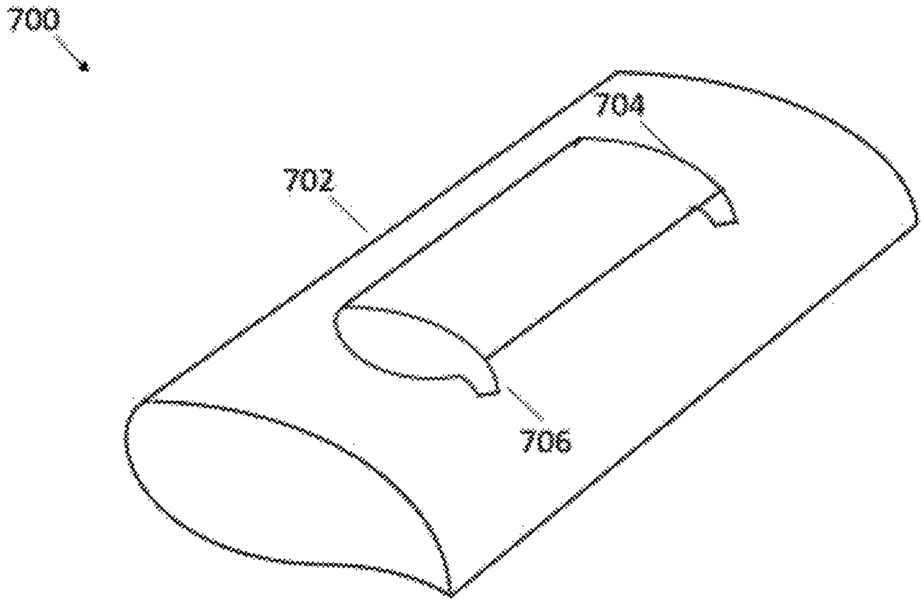
FIG. 7 is an illustrative perspective view of a method of attaching a multi-element airfoil to the blade body, in accordance with an embodiment of this disclosure.

FIG. 7 is an illustrative perspective view 700 of a method of attaching the multi-element airfoils 704 to the blade body 702. Referring to FIG. 7, the multi-element airfoils 704 may be connected with the blade body 702 by a mechanical connection such as a strut 706 or the like. The mechanical connections 706 may be designed to transmit the load generated from the multi-element airfoils to the blade body, position the multi-element airfoils relative to the blade body with little or no deformation under load, to be segmented in such a way as to not suffer damage when the blade bends. In an embodiment, the leading edge and/or the trailing edge elements may be integral to the shells of the blade body (meaning a common outer shell). Integration of the leading edge and/or the trailing edge elements with the blade body may alleviate some of the positioning constrains. These integral approaches may then use "slots" and/or "slits" to allow airflow though their respective gaps.

As previously mentioned, the use of a simplified blade body of the longitudinal section of the blade makes it possible to use that blade body for several different types of blades and use multi-element airfoils to compensate for the off-design characteristics of the blade body. In principle, a first blade may be reused entirely for a second blade, for instance by providing the first blade with a hub extender. In this situation, substantially the entire hatched part of the second blade be encumbered with off-design conditions and a majority of this section will need the use of multi-element airfoils.

Structurally, each radial section may be provided with multi-element airfoils in order to optimize the lift of the substantially straight blade. This provides a large number of possibilities for the design of blades, be optimized for the local radial velocity of the blade during normal use, i.e., at the design point. This means that the blade can be manufactured from individual sectional blade parts, e.g., as individual blade parts, which are mutually connected afterwards, or by use of sectional mold parts. Alternatively, a given blade may be fitted with a hub extender without changing the direction of the chord for a given radial position of the blade. In this situation, the multi-element airfoils may be utilized to compensate for a non-ideal profile. Thus, the mold assemblies may be manufactured with a much simpler shape. Also, such a blade may make it possible to manufacture the blade via simpler fabrication methods, such as extrusion or the like. Further, in implementations of the present disclosure, the blade manufacturing process may be simplified because the blades have far less curvature.

Such a blade segment has a number of advantages with respect to obtaining a feasible modular design, where the blade body is reused on another blade type or where it is "connected" to a second blade body of a second longitudinal segment and having another dependency on the radial position, optionally via an intermediate, transitional blade segment.

The blade may include a number of modular blade sections. The root region may for instance be such a blade section. The blade may also be a dividable or split blade, in which case the blade may be divided at one end of the root region, the modular blade sections include a root section, the root region and a tip section, one modular blade section from the group of root sections, optionally at least one modular blade section from the group of extender sections, at least one modular blade section from the group of airfoil sections and one modular blade section from the group of tip sections can be combined and assembled, so as to form blades with different lengths.

Most of the multi-element airfoils described in the non-limiting examples above are positioned fixedly with respect to the blade body. In an embodiment, the multi-element airfoils may include activated elements that change their positions with respect to the blade body. In an embodiment, the multi-element airfoils may include flexible multi-element airfoils that deform under load.

In operation, implementations of the present disclosure achieve a partial de-coupling between the structural constraints and the aerodynamic performance of a wind turbine blade operating under extreme spatio-temporal conditions. The chord length and the lift coefficient may be customized together to achieve a nominal spanwise distribution of chord that ensures that the blades are always in a typhoon "safe" condition. The blades include a blade body and a multi-element airfoil. The multi-element airfoils are coupled to the blade body in order to adjust and meet the aerodynamic design target of the blade sections. The blade body may be designed to have optimal extreme environment properties and may not necessarily have optimal aerodynamic performance. The multi-element airfoils may be designed to enhance the aerodynamic performance of the blade body from non-optimum to near-optimum target conditions. Mathematically, lift is expressed as (0.5*density*velocity of flow^2*(chord length*span section)*lift_coefficient). The chord length of the blade body may be reduced section-by-section through the use of multiple airfoil elements (leading edge slats, trailing edge flaps, and potentially mid span elements, up to and including a combination of all types into a "cascade"), allowing for step increases in the lift coefficient. The increases the in lift coefficient may be utilized to counterbalance the overall loss in lift from chord reductions.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the disclosure is not limited to the implementations described and can be practiced with modification and alteration within the spirit and scope of the appended claims. The description is thus illustrative instead of limiting.

What is claimed is:

1. A wind turbine rotor blade comprising:

a blade body having a shape that generates a lift when impacted by an incident airflow, wherein the blade body comprises a pressure side and a suction side joining at a leading edge, and a trailing edge, the blade body longitudinally extending from a root region beginning from a proximal end of the blade body and extending up to a predetermined first length of the blade body, to a tip region beginning from a distal end of the blade body and extending up to a predetermined second length of the blade body, through a transition region extending between and joining the root region and the tip region, wherein the blade body comprises a substantially cylindrical or circular or elliptical or eccentric body of revolution cross-section beginning from the root region up to a predetermined length of the blade body in the direction of the tip region, and further wherein a chord length of the blade body monotonically decreases from the proximal end of the blade body through the transition region; and a plurality of flow enhancing components physically coupled to the blade body and configured to enhance a plurality of aerodynamic flow characteristics of the blade body.

2. The wind turbine rotor blade of claim 1, wherein the blade body comprises a substantially linear profile.

3. The wind turbine rotor blade of claim 1, wherein the flow enhancing components comprise multi-element airfoils, and surface mounted elements.

4. The wind turbine rotor blade of claim 3, wherein the multi-element airfoils comprise slats, and flaps.

5. The wind turbine rotor blade of claim 3, wherein the multi-element airfoils comprise boundary layer control components.

6. The wind turbine rotor blade of claim 5, wherein the boundary layer control components comprise ventilation holes, ventilation slots, vortex generators, and Gurney flaps.

7. The wind turbine rotor blade of claim 3, wherein the surface mounted elements comprise leading edge elements and surface mounted flaps.

8. The wind turbine rotor blade of claim 1, wherein the blade body comprises a plurality of modular segments axially joined with each other.

9. A wind turbine rotor blade comprising the blade body and the plurality of flow enhancing components of claim 1.

10. A wind turbine comprising one or more turbine blades, the one or more wind turbine blades comprising the blade body and the plurality of flow enhancing components of claim 1.

11. A method of manufacturing a wind turbine rotor blade comprising:

providing a blade body having a shape that generates a lift when impacted by an incident airflow;

longitudinally extending the blade body from a root region beginning from a proximal end of the blade body and extending up to a predetermined first length of the blade body, to a tip region beginning from a distal end of the blade body and extending up to a predetermined second length of the blade body, through a transition region extending between and joining the root region and the tip region, the blade body comprising a pressure side and a suction side joining at a leading edge, and a trailing edge, and the blade body further comprising a substantially cylindrical or circular or elliptical or eccentric body of revolution cross-section beginning from the root region up to a predetermined length of the blade body in the direction of the tip region, wherein a chord length of the blade body monotonically decreases from the proximal end of the blade body through the transition region;

providing a plurality of flow enhancing components configured to enhance a plurality of aerodynamic flow characteristics of the blade body; and physically coupling the flow enhancing components with the blade body.

12. The method of claim 11, wherein the blade body further comprises a substantially linear profile.

13. The method of claim 11, wherein the flow enhancing components comprise multi-element airfoils, and surface mounted elements.

14. The method of claim 13, wherein the multi-element airfoils comprise slats, and flaps.

15. The method of claim 13, wherein the multi-element airfoils comprise boundary layer control components.

16. The method of claim 15, wherein the boundary layer control components comprise ventilation holes, ventilation slots, vortex generators, and Gurney flaps.

17. The method of claim 13, wherein the surface mounted elements comprise leading edge elements and surface mounted flaps.

18. The method of claim 11, wherein the blade body comprises a plurality of modular segments axially joined with each other.

* * * * *